(12) United States Patent
Burkhardt et al.

(10) Patent No.: US 8,489,307 B2
(45) Date of Patent: Jul. 16, 2013

(54) METHOD AND DEVICE FOR OPERATING AN INTERNAL COMBUSTION ENGINE

(75) Inventors: Thomas Burkhardt, Neutraubling (DE); Bernhard Niebler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 847 days.

(21) Appl. No.: 12/302,556

(22) PCT Filed: May 22, 2007

(86) PCT No.: PCT/EP2007/054935
§ 371 (c)(1),
(2), (4) Date: Nov. 26, 2008

(87) PCT Pub. No.: WO2008/012125
PCT Pub. Date: Jan. 31, 2008

(65) Prior Publication Data
US 2009/0157280 A1     Jun. 18, 2009

(51) Int. Cl.
*G06F 19/00* (2011.01)
*F02M 35/10* (2006.01)

(52) U.S. Cl.
USPC .......................................................... 701/102

(58) Field of Classification Search
USPC ................ 701/103, 102; 123/184.47, 184.51, 123/184.53, 184.55, 184.56, 308; 73/114.31, 73/114.36, 114.37
See application file for complete search history.

(56) References Cited

U.S. PATENT DOCUMENTS

| | | | | |
|---|---|---|---|---|
| 5,249,459 A | | 10/1993 | Backer | 73/118.1 |
| 5,889,205 A | * | 3/1999 | Treinies et al. | 73/114.32 |
| 5,937,821 A | * | 8/1999 | Oda et al. | 123/295 |
| 6,250,292 B1 | * | 6/2001 | Suhre | 123/688 |
| 6,349,592 B1 | * | 2/2002 | Hirasawa et al. | 73/114.33 |
| 6,363,316 B1 | * | 3/2002 | Soliman et al. | 701/104 |
| 6,546,789 B1 | * | 4/2003 | Wild | 73/114.32 |
| 6,820,595 B2 | * | 11/2004 | Kobayashi et al. | 123/478 |
| 6,848,420 B2 | * | 2/2005 | Ishiguro et al. | 123/399 |
| 6,971,368 B2 | * | 12/2005 | Uchiyama | 123/359 |
| 6,985,806 B2 | * | 1/2006 | Stadler | 701/102 |
| 7,213,559 B2 | * | 5/2007 | Kobori | 123/184.55 |
| 2002/0107630 A1 | * | 8/2002 | Yagi | 701/102 |
| 2006/0037596 A1 | * | 2/2006 | Fuwa | 123/681 |

(Continued)

FOREIGN PATENT DOCUMENTS

| | | |
|---|---|---|
| DE | 4005973 | 2/1990 |
| DE | 19727669 A1 | 6/1997 |

(Continued)

*Primary Examiner* — Mahmoud Gimie
*Assistant Examiner* — David Hamaoui
(74) *Attorney, Agent, or Firm* — King & Spalding L.L.P.

(57) ABSTRACT

In a method and device for operating an internal combustion engine with an intake tract, a switching device for modifying an effective intake pipe length and/or an effective intake tract volume is arranged. By a dynamic intake tract model an estimated intake pipe pressure is determined. The dynamic model is adapted dependent on a trimming value. If a switching position modification is controlled, an estimated old position intake pipe pressure on the one hand is determined with the previous switching position and preventing of the adaptive trimming value adjustment and on the other hand an estimated new position intake pipe pressure is determined with the modified switching position and prevention of the adaptive trimming value adjustment and dependent on a correlation check of the estimated old position pressure and the estimated new position pressure with respect to the measured pressure an actual switching position of the switching device is identified.

4 Claims, 4 Drawing Sheets

U.S. PATENT DOCUMENTS

| | | | |
|---|---|---|---|
| 2006/0096581 A1* | 5/2006 | Pauli et al. | 123/480 |
| 2006/0184311 A1 | 8/2006 | Schulte et al. | 701/114 |
| 2010/0152992 A1* | 6/2010 | Burkhardt et al. | 701/102 |
| 2010/0185379 A1* | 7/2010 | Burkhardt et al. | 701/103 |

FOREIGN PATENT DOCUMENTS

| | | |
|---|---|---|
| DE | 19727669 B4 | 1/1999 |
| DE | 10346734 | 10/2003 |
| EP | 0820559 | 4/1996 |

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2007/054935 filed May 22, 2007, which designates the United States of America, and claims priority to German Application No. 10 2006 035 096.0 filed Jul. 28, 2006, the contents of which are hereby incorporated by reference in their entirety.

TECHNICAL FIELD

The invention relates to a method and a device for operating an internal combustion engine with an intake tract, in which a switching device for changing an effective intake pipe length and/or an effective intake tract volume is arranged.

BACKGROUND

Precise setting of a desired air/fuel ratio in the combustion chambers of the cylinders of the internal combustion engine is particularly advantageous with a view to raw emissions of pollutants by the internal combustion engine which are as low as possible. A substantial contribution to the precise setting of the air/fuel ratio in the respective combustion chambers of the cylinders of the internal combustion engine can be influenced by precise knowledge of an intake pipe pressure in the respective intake pipe of the intake tract of the internal combustion engine.

In this context it is known by means of a physical dynamic model of the intake tract to determine an estimate value of the intake pipe pressure. Such a dynamic physical model is known for example from the specialist book "Handbook Combustion Engine", published by Richard Basshuysen, Friedrich Vieweg Verlagsgesellschaft mbh, Braunschweig/Wiesbaden, second improved edition June 2002 Pages 557 to 559, the contents of which are hereby incorporated by reference in their entirety.

In addition, implementation of such a dynamic physical model of the intake tract of the internal combustion engine is also known from EP 0 820 559 B1, which corresponds to U.S. Pat. No. 5,889,205, the contents of which patents are hereby incorporated by reference in their entirety. Here, a linear relationship in sections is assumed between the fresh gas mass flow and the intake pipe pressure for determining the fresh gas mass flow flowing into the respective combustion chambers. A slope and an absolute term taking into account substantial influence factors are determined as function of the rotational speed, the suction pipe geometry, the number of cylinders, the valve timing and the temperature of the air in the intake pipe. These values are preferably stored in the characteristics of an electronic engine control device. A reduced flow cross section with regard to the throttle flap on the one hand is determined dependent on the throttle flap position and additionally adapted in form of a control circuit depending on a deviation of an estimate value of the intake pipe pressure determined by means of the model and a measured intake pipe pressure.

SUMMARY

According to various embodiments, a method and a device for operating an internal combustion engine can be created which make possible a simple and reliable operation of the internal combustion engine.

According to an embodiment, a method for operating an internal combustion engine with an intake tract, in which a switching device for modifying at least one of an effective intake pipe length and an effective intake tract volume is arranged, may comprise the steps of: by means of a dynamic model of the intake tract, determining an estimated intake pipe pressure dependent on at least one operating quantity of the internal combustion engine; adapting the dynamic model dependent on a trimming value, which is adaptively adjusted dependent on the estimated and a measured intake pipe pressure; if a modification of a switching position of the switching device is controlled, determining an estimated old position intake pipe pressure on the one hand dependent on the model assuming the occupation of the previous switching position of the switching device and preventing of the adaptive adjustment of the trimming value and on the other hand, determining an estimated new position intake pipe pressure dependent on the model subject to the assumption of assuming the modified switching position of the switching device and prevention of the adaptive adjustment of the trimming value and dependent on a correlation check of the estimated old position intake pipe pressure and the estimated new position intake pipe pressure with respect to the measured intake pipe pressure, identifying an actual switching position of the switching device.

According to a further embodiment, the estimated old position and new position intake pipe pressure can be determined for so long after the controlling of the modification of the switching position of the switching device until one of the estimated old position or the new position intake pipe pressure in predetermined manner correlates more strongly to the measured intake pipe pressure. According to a further embodiment, in the event that a modification of the switching position of the switching device is controlled, an adapted estimated new position intake pipe pressure may additionally be determined dependent on the model assuming the occupation of the modified switching position of the switching device and continuation of the adaptive adjustment of the trimming value and upon identified concurrence of the actual switching position with the control switching position the further adaptively adjusted trimming value is used as a base for the model.

According to another embodiment, a device for operating an internal combustion engine with an intake tract in which a switching device for modifying at least one of an effective intake pipe length and an effective intake tract volume is arranged, may be operable to determine an estimated intake pipe pressure dependent on at least one operating quantity of the internal combustion engine by means of a dynamic physical model, —wherein the device is further operable to carry out an adaptation of the dynamic model dependent on a trimming value which is adaptively adjusted dependent on the estimated and a measured intake pipe pressure, —wherein the device is further operable in the event that a modification of the switching position of the switching device is controlled, on the one hand to determine an estimated old position intake pipe pressure dependent on the model assuming the occupation of the previous switching position of the switching device subject to the prevention of the adaptive adjustment of the trimming value and on the other hand to determine an estimated new position intake pipe pressure dependent on the model assuming the occupation of the modified switching position of the switching device and prevention of the adaptive adjustment of the trimming value, —and wherein the device is further operable to identify an actual switching position of the switching device dependent on a correlation check of the estimated old position intake pipe pressure and the estimated new position intake pipe pressure with respect to the measured intake pipe pressure.

According to another embodiment, a method for operating an internal combustion engine with an intake tract in which a switching device for modifying at least one of an effective intake pipe length and an effective intake tract volume is arranged, may comprising the steps of: by means of a dynamic model of the intake tract, determining an estimated air mass flow dependent on at least one operating quantity of the internal combustion engine, and adapting the dynamic model dependent on a trimming value, which is adaptively adjusted dependent on the estimated and a measured air mass flow, wherein in the event that a modification of a switching position of the switching device is controlled, on the one hand an estimated old position air mass flow is determined dependent on the model assuming the occupation of the previous switching position of the switching device and prevention of the adaptive adjustment of the trimming value and on the other hand an estimated new position air mass flow is determined dependent on the model assuming the occupation of the modified switching position of the switching device and prevention of the adaptive adjustment of the trimming value and dependent on a correlation check of the estimated old position air mass flow and the estimated new position air mass flow an actual switching position of the switching device is identified with respect to the measured air mass flow.

According to a further embodiment, the estimated old position and new position air mass flow can be determined so long after the controlling of the modification of the switching position of the switching device until one of the estimated old position or the new position air mass flow in predetermined manner correlates more strongly to the measured air mass flow. According to a further embodiment, in the event that a modification of the switching position of the switching device is controlled, an adapted estimated new position air mass flow may additionally be determined dependent on the model assuming the occupation of the modified switching position of the switching device and continuation of the adaptive adjustment of the trimming value and with identified concurrence of the actual switching position with the control switching position the further adaptively adjusted trimming value is used as a base for the model.

According to another embodiment, a device for operating an internal combustion engine with an intake tract, may comprise a switching device for modifying an effective intake pipe length and/or an effective intake tract volume, wherein the device may be operable to determine an estimated air mass flow dependent on at least one operating quantity of the internal combustion engine by means of a dynamic physical model of the intake tract, and the device may be further operable—to carry out an adaptation of the dynamic model dependent on a trimming value which is adaptively adjusted dependent on the estimated and a measured air mass flow, —in the event that a modification of the switching position of the switching device is controlled, to determine on the one hand an estimated old position air mass flow dependent on the model assuming the occupation of the previous switching position of the switching device subject to preventing the adaptive adjustment of the trimming value and on the other hand to determine an estimated new position air mass flow dependent on the model assuming the occupation of the modified switching position of the switching device and prevention of the adaptive adjustment of the trimming value, —and to identify an actual switching position of the switching device dependent on a correlation check of the estimated old position air mass flow and the estimated new position air mass flow with regard to the measured air mass flow.

BRIEF DESCRIPTION OF THE DRAWINGS

In the following, exemplary embodiments of the invention are explained in more detail by means of the schematic drawings.

It shows.

Elements of identical construction or function are designated with the same reference symbols across the Figures.

DETAILED DESCRIPTION

Figure 1:
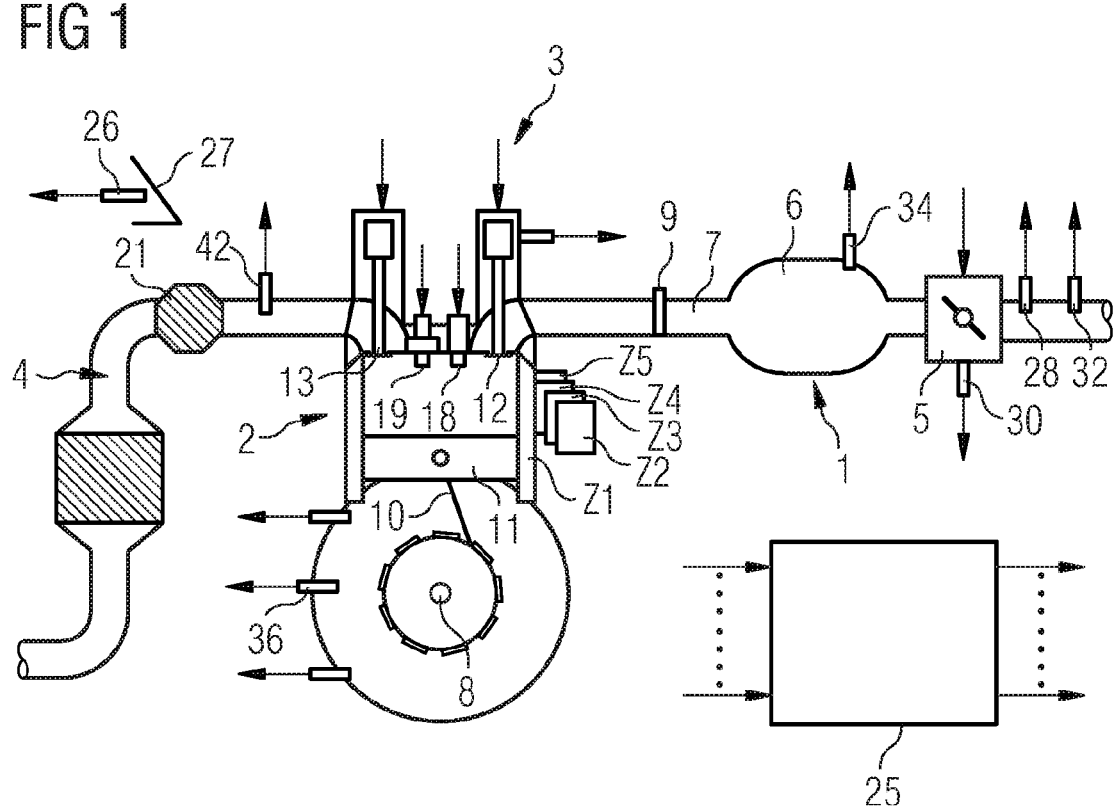
FIG. 1 an internal combustion engine with a control device.

According to a first aspect, in a method and a corresponding device for operating an internal combustion engine with an intake tract, a switching device for varying an effective intake pipe length and/or an effective intake tract volume is arranged. By means of a dynamic model of the intake tract an estimated intake pipe pressure is determined dependent on at least one operating quantity of the internal combustion engine. Adaptation of the dynamic model takes place dependent on a trimming value which is adaptively adjusted dependent on the estimated and a measured intake pipe pressure. In the event that varying of the switching position of the switching device is controlled, an estimated old position intake pipe pressure is determined on the one hand dependent on the model assuming the occupation of the previous switching position of the switching device and preventing the adaptive adjustment of the trimming value and an estimated new position intake pipe pressure is determined on the other hand dependent on the model assuming the occupation of the modified switching position of the switching device and preventing of the adaptive adjustment of the trimming value. Depending on a correlation check of the estimated old position intake pipe pressure and the estimated new position intake pipe pressure an actual switching position of the switching device is identified with respect to the measured intake pipe pressure. In this manner the actual switching position of the switching device can be identified in a particularly reliable and simultaneously simple manner, more preferably since the influence of additional interference quantities of the model is only negligible.

According to an embodiment, the estimated old position and new position intake pipe pressure is determined after the controlling of the varying of the switching position of the switching device until one of the estimated old position or new position intake pipe pressures in a predetermined manner correlates more strongly to the measured intake pipe pressure.

In this context it can be easily ensured at changeover points of the switching position of the switching device with basically unchanged intake pipe pressure between the two different switching positions so that the actual switching position is then also reliably identified and on the other hand the actual switching position is also identified as quickly as possible and the adaptive adjustment of the trimming value can be immediately continued and determining of the estimated intake pipe pressure with particular precision is thus possible.

According to a further embodiment, an adapted estimated new position intake pipe pressure is determined dependent on the model assuming the occupation of the changed switching position of the switching device and continuation of the adaptive adjustment of the trimming value is determined if a modifying of the switching position of the switching device is controlled. Upon identified concurrence of the actual switching position and the controlled switching position the further adaptively adjusted trimming value is then immediately used as a base for the model. In this manner, influences through possible interference quantities can be immediately included in the trimming value during the time until the actual switching position is identified and the dynamic model then suitably corrected with that trimming value which takes into account the current conditions, once the actual switching position has been identified.

According to a second aspect, in a method and a corresponding device for operating an internal combustion engine with an intake tract, a switching device for changing an effective intake pipe length and/or an effective intake tract volume is arranged. By means of a dynamic model of the intake tract an estimated air mass flow is determined dependent on at least one operating quantity of the internal combustion engine. Adapting the dynamic model takes place dependent on a trimming value which is adaptively adjusted depending on the estimated and a measured air mass flow. If changing of the switching position of the switching device is controlled, an estimated old position air mass flow is determined on the one hand dependent on the model assuming the occupation of the previous switching position of the switching device and preventing the adaptive adjustment of the trimming value and on the other hand an estimated new position air mass flow is determined dependent on the model assuming the occupation of the modified switching position of the switching device and preventing of the adaptive adjustment of the trimming value. Dependent on a correlation check of the estimated old position air mass flow and the estimated new position air mass flow an actual switching position of the switching device is identified with respect to the measured air mass flow. In this manner the actual switching position of the switching device can be identified in a particularly reliable and simultaneously simple manner, more preferably since the influence of additional interference quantities of the model in this context is only negligible.

According to an embodiment, the estimated old position and new position air mass flow is determined after the controlling of the changing of the switching position of the switching device until one of the estimated old position or new position air mass flow in predetermined manner correlates more strongly to the measured air mass flow. In this context it can be easily ensured with changeover points of the switching position of the switching device with basically unchanged air mass flow between the two different switching positions that the actual switching position is then also reliably identified and on the other hand the actual switching position is also identified as quickly as possible and the adaptive adjustment of the trimming value can also be immediately continued and determining the estimated air mass flow with particular precision is thus possible.

According to a further embodiment, an adapted estimated new position air mass flow is determined dependent on the model assuming the occupation of the modified switching position of the switching device and continuation of the adaptive adjustment of the trimming value is determined if changing of the switching position of the switching device is controlled. Upon identified concurrence of the actual switching position and the control switching position the further adaptively adjusted trimming value is then immediately used as a base for the model. In this manner influences through possible interference quantities can be immediately incorporated in the trimming value during the period until the actual switching position is identified and the dynamic model then suitably corrected with this trimming value which takes into account the current conditions once the actual switching position has been identified.

An internal combustion engine (FIG. 1) comprises an intake tract 1, an engine block 2, a cylinder head 3 and an exhaust tract 4. The intake tract 1 preferentially comprises a throttle flap 5, furthermore a manifold 6 and an intake pipe 7 which is routed to a cylinder Z1 into the engine block 2 via an inlet port.

Furthermore, a switching device 9 for modifying an effective intake pipe length and/or of an effective intake tract volume is present in the intake tract. The switching device can for example be provided as switching flap in the respective intake pipe 7 and so determine an effective intake pipe length of the intake pipe 7 dependent on its switching position.

Communication of the intake pipes among themselves can for example take place in a switching position with the effect that flow-technically a second manifold is formed and in a further switching position this communication is prevented.

Furthermore, the switching device 9 can also be embodied so that the drawn-in air flows for example through differing sections of the intake pipe 7 depending on the switching position, which have a differing length and the effective intake pipe length can thus also be changed over. The switching device 9 can also be embodied so that the utilized volume of the intake tract changes depending on its switching position. The switching device 9 can be embodied so as to either make possible a vibration charge or also a resonance charge in the combustion chamber of cylinder Z1.

Through suitable setting of the switching position dependent for example on the rotational speed or another load quantity of the internal combustion engine increased charging of the respective combustion chamber of the cylinder Z1 can then be achieved dependent on the number of different switching positions of the switching device in a plurality of operating ranges of the internal combustion engine.

The engine block furthermore comprises a crankshaft 8 which is coupled with the piston 11 of the cylinder Z1 via a connecting rod 10.

The cylinder head 3 comprises a valve drive with a gas inlet 12 and a gas exhaust valve 13. The cylinder head 3 furthermore comprises an injection valve 18 and a spark plug 19.

An exhaust catalytic converter 21 is arranged in the exhaust tract 4 which preferably is embodied as 3-way catalytic converter.

A control device 25 is provided which is associated with sensors which sense the various measured quantities and in each case determine the measured value of the measured quantity. Operating quantities comprise the measured quantities and quantities derived from these. Dependent on at least one of the operating quantities, the control device 25 determines adjusting quantities which are then converted into one or a plurality of adjusting signals for controlling the actuators by means of suitable actuator drives. The control device 25 can also be designated as device for controlling the internal combustion engine or as device for operating the internal combustion engine.

The sensors are a pedal position sensor 26, which senses a driving pedal position of a driving pedal 27, an air mass sensor 28, which senses an air mass flow upstream of the throttle flap 5 as measured air mass flow MAF_MES, a throttle flap position sensor 30, which senses a throttle valve position TBS, a temperature sensor 32, which senses an intake air temperature T_IM, an intake pipe pressure sensor 34, which senses a measured intake pipe pressure MAP_MES in the manifold 6, a crankshaft angle sensor 36, which senses a crankshaft angle, which is then assigned a rotational speed.

Furthermore, an exhaust probe 42 is provided which is arranged upstream of the exhaust catalytic converter 21 in the exhaust tract 4 and which senses a residual oxygen content of the exhaust gas and the measuring signal of which is characteristic for the air/fuel ratio in the combustion chamber of the cylinder Z1 before the oxidation of the fuel.

In addition to this, a separate pressure sensor for sensing the pressure PUT upstream of the throttle valve 5 can also be provided in the intake tract 1. However, this can also be effected through suitable signal evaluation of the measuring signal of the intake pipe pressure sensor 34 for example in an operating state of full load, in which a pressure drop via the throttle flap 5 is negligible or can be accurately modeled.

Depending on the embodiment any sub-quantity of the mentioned sensors can be present or additional sensors can also be present.

The actuators are for example the throttle flap 5, the gas inlet and gas exhaust valves 12, 13, the switching device 9, the injection valve 18 or the spark plug 19.

Preferably the internal combustion engine comprises additional cylinders Z2 to Z6 each of which is then also assigned suitable actuators and sensors and also intake pipes 7.

Figure 2:
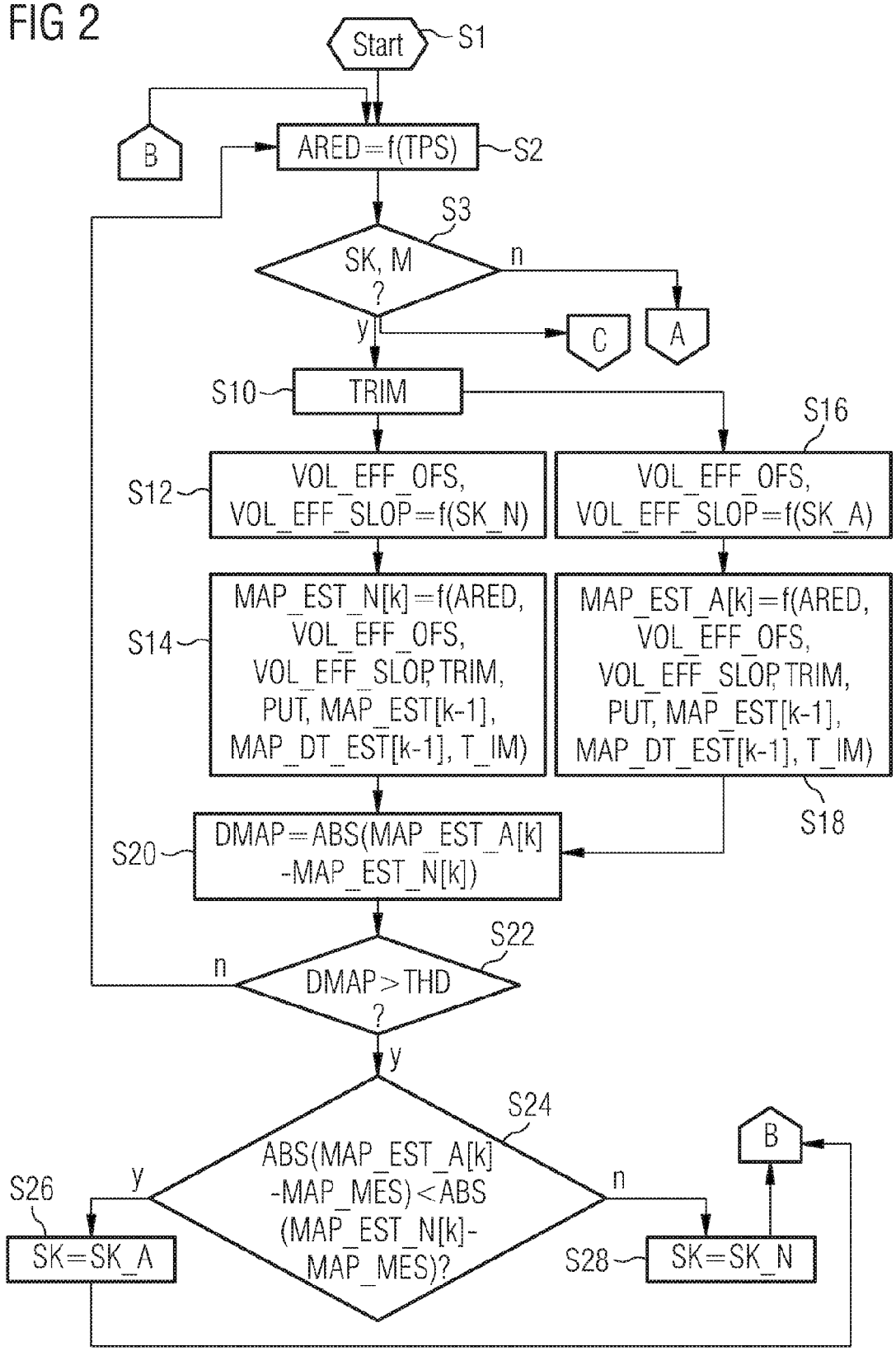
FIGS. 2 & 3 a flow diagram of a program for operating the internal combustion engine which is executed in the control device, and FIG. 4 a further flow diagram of a further program for operating the internal combustion engine, which is executed in the control device.
Figure 3:
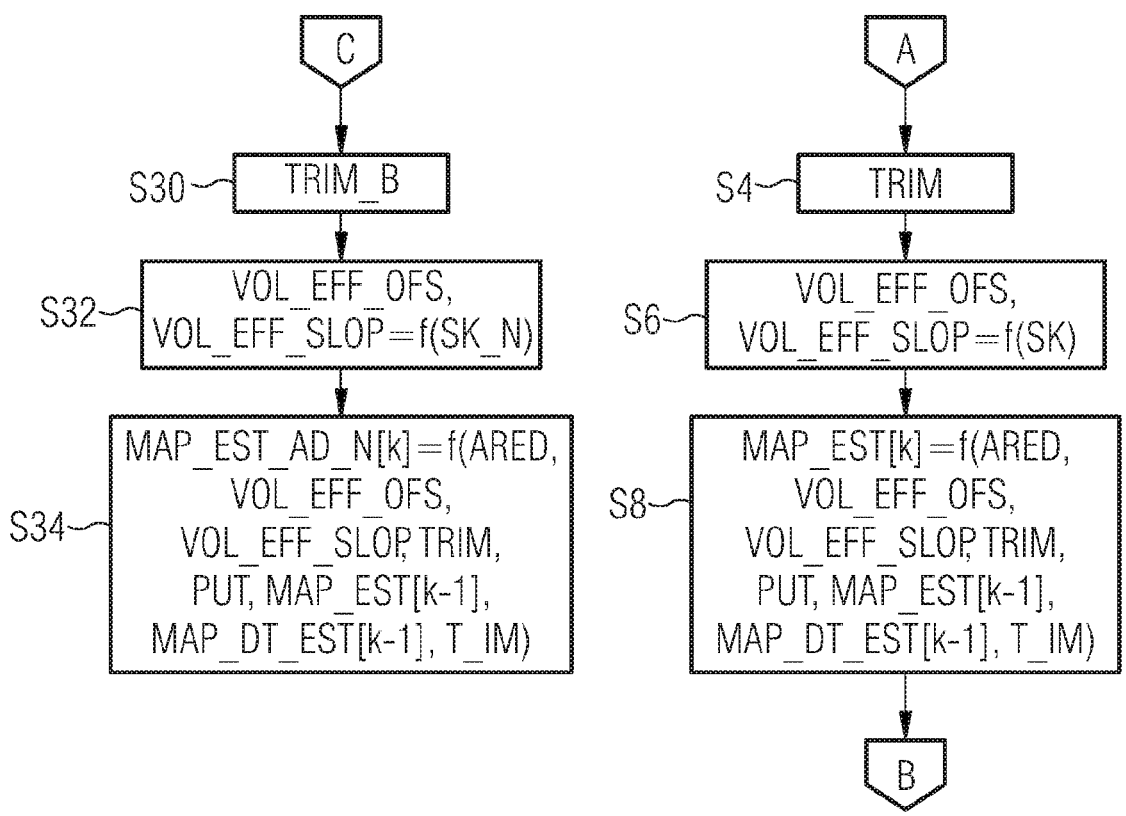

A program for operating the internal combustion engine is stored in a memory of the control device 25 and is executed in the control device during the operation of the internal combustion engine. The program for operating the internal combustion engine is explained in more detail in the following by means of the flow diagram of FIGS. 2 and 3. The program is started very close in time to a start of the internal combustion engine in a step S1. In the step S1 variables can be initialized if applicable. In a step S2 a reduced flow cross section ARED of the intake pipe 7 is determined in the region of the throttle flap 5 dependent on the throttle flap position TPS. To this end, a family of characteristics with suitable data or a characteristic line with suitable data can be provided.

In a step S3 it is subsequently checked if a modifying of the switching position of the switching device 9 is controlled or a marker M is set. The marker M is preferably reset at the start. The controlling of a modified switching position of the switching device 9 is preferably effected by means of a further function which is also stored in the control device 25 in form of a program and is executed during the operation of the internal combustion engine.

If the condition of the step S3 is not fulfilled, processing is continued in a step S4 (FIG. 3) in which a trimming value TRIM is adaptively adjusted dependent on the estimated intake pipe pressure MAP_EST and the associated measured intake pipe pressure MAP_MES determined in connection with a preceding pass of the step S8. The trimming value TRIM is preferably employed for correcting the reduced flow cross section ARED but can however be also employed for example for correcting the pressure PUT upstream of the throttle flap 5. In the process, the trimming value TRIM is preferably adaptively adjusted in the step S4 so that a deviation between the estimated value MAP_EST and the measured intake pipe pressure MAP_MES is minimized. In this connection, values of the trimming value TRIM determined during previous passes are also taken into account.

In a step S6 characteristic values for characterizing a capacity line are subsequently determined which model the capacity behavior of the respective combustion chambers with respect to the inflow of gas via the respective intake pipe 7. In this connection a linear approach is preferably used in sections preferably with an offset VOL_EFF_OFS of a volumetric efficiency and a slope VOL_EFF_SLOP of the volumetric efficiency. The offset VOL_EFF_OFS and the slope VOL_EFF_SLOP are determined at least dependent on the switching position SK of the switching device 9 in the step S6. A corresponding linear approach by sections for modeling the capacity line is also disclosed in U.S. Pat. No. 5,889,205 (EP 0820 559 B1), whose content is incorporated by reference in this regard. Furthermore, a corresponding approach is also disclosed on Page 558 in the specialist book "Handbook Combustion Engine" which was already quoted at the outset, whose content is also incorporated by reference in this regard.

In a step S8 the estimated intake pipe pressure MAP_EST is then determined for the current calculation cycle which is characterized by "(K)". The current calculation cycle is preferably a current cylinder segment. The duration of a cylinder segment based on the crankshaft angle is that angle which is obtained from the division of the total angle for a working cycle divided by the number of the cylinders. Thus the cylinder segment with a 4-stroke internal combustion engine with 4 cylinders for example amounts to 180° crankshaft angle.

"(K−1)" in this connection represents the preceding calculation cycle, i.e. for example the preceding cylinder segment.

The estimated intake pipe pressure MAP_EST is determined by means of a dynamic physical model of the intake tract whose fundamentally concrete embodiment for example is explained in more details in U.S. Pat. No. 5,889,205 (EP 0820 559 B1) or also on Pages 557 to 559 in the specialist book "Handbook Combustion Engine" which was already quoted at the outset and whose content is incorporated by reference in this regard. The estimated intake pipe pressure MAP_EST is determined by means of the dynamic physical model dependent on the reduced flow cross section ABED specifically taking into account preferably the trimming value TRIM, the offset VOL_EFF_OFS and the slope VOL_EFF_SLOP of the volumetric efficiency, the pressure PUT upstream of the throttle flap 5, the intake air temperature T_IM, of the estimated intake pipe pressure MAP_EST determined during the preceding calculation cycle and an estimated temporal deduction MAP_DT-EST of the intake pipe pressure during the preceding calculation cycle.

In this connection an approach is selected for example which corresponds to the approach according to U.S. Pat. No. 5,889,205 (EP 0820 559 B1), incorporated by reference, and there more preferably corresponds to the relationship 2.7. After this, processing, if applicable after a waiting period that can be predetermined or a crankshaft angle that can be pre-determined, is again continued in step S2.

If the condition of step S3 however is fulfilled, the trimming value TRIM is determined in a step S10 but the adaptive adjustment of the trimming value TRIM prevented, i.e. calculation is performed with trimming values TRIM adaptively adjusted during previous calculation cycles.

In a step S12 the offset VOL_EFF_OFS and the slope VOL_EFF_SLOP of the volumetric efficiency are then determined using a new position SK_N of the switching position SK of the switching device 9 as a base, wherein the new position SK_N corresponds to the controlled modified switching position SK of the switching device. Otherwise the approach according to step S12 corresponds to that according to step S6.

In a step S4 an estimated new position intake pipe pressure MAP_EST_N is subsequently determined by means of the dynamic model for determining the estimated intake pipe pressure MAP_EST using the values determined in steps S10 and S12 as a base.

Quasi parallel to this, steps S16 and S18 are executed. In step S16 the offset VOL_EFF_OFS and the slope VOL_EFF_SLOP of the volumetric efficiency are determined for an old position SK_A of the switching position SK of the switching device, wherein the old position SK_A corresponds to that before the controlling of the modified switching position SK.

In the step S18 an estimated old position intake pipe pressure MAP_EST_A is then determined dependent on the dynamic physical model of the intake tract assuming the occupation of the unmodified switching position, i.e. the old position SK_A of the switching device 9 and subject to the prevention of the adaptive adjustment of the trimming value TRIM. During the passes of the steps S14 and S18 the respective estimated new position intake pipe pressure MAP_EST_N and the old position intake pipe pressure MAP_EST_A respectively is preferably used as a base with regard to the intake pipe pressure MAP_EST (K__1) applicable with the preceding calculation cycle and its temporal deduction MAP_ET_EST (K__1). An exception from this if applicable is formed by a calculation cycle with which the condition of the step S3 was newly fulfilled by a controlling of the modifying of the switching position SK of the switching device 9 and thus the steps S4 to S8 were executed during preceding calculation cycles. In this case the estimated intake pipe pressure MAP_EST determined with the respective preceding calculation cycle of the step S8 is utilized.

In a step S20 an estimated value difference DMAP is determined, specifically dependent on an amount ABS of the estimated old position intake pipe pressure MAP_EST_A less the estimated new position intake pipe pressure MAP_EST_N.

In a step S22 it is checked if the estimated value difference DMAP is greater than a suitably predetermined threshold value THD. The threshold value THD is predetermined here so that reliable identification of the actual switching position SK of the switching device 9 by means of the following steps is preferably possible only after the estimated value difference DMAP has been exceeded relative to the threshold value THD.

If the condition of the Step S22 is thus not fulfilled, processing is continued anew if applicable after the predetermined waiting period or the predetermined crankshaft angle in the step S2. If the condition of the step S22 is fulfilled however, it is checked in a step S24 if the amount ABS of a difference of the estimated old position intake pipe pressure MAP_EST_A and the measured intake pipe pressure MAP_MES is smaller than the amount ABS of a difference of the estimated new position intake pipe pressure MAP_EST_N and the measured intake pipe pressure MAP_MES. Through this condition there follows thus a concrete realization of a correlation check of the estimated old position intake pipe pressure MAP_EST_A and the estimated new position intake pipe pressure MAP_EST_N with respect to the measured intake pipe pressure MAP_MES.

If the condition of the step S24 is fulfilled, the old position SK-A is identified as the actual switching position SK of the switching device 9 in a step S26 and thus no modifying of the switching position SK has taken place despite the controlled modifying of the switching position SK of the switching device 9.

If the condition of the step S24 however is not fulfilled, the new position SK_N is then assigned to the switching position SK in a step S28 and thus identified as the actual switching position SK. Alternatively the condition of the step S24 can also be expanded to the effect that the original condition of the step S24 has to be fulfilled with multiple passes of the step S24 before the steps S26 or S28 are then executed accordingly. In this case, feedback from step S24 to step S2 is then additionally provided.

In connection with the execution of the steps S26 and S28 the marker M is then also preferably reset again. During a pass of the step S6 following this, the switching position SK suitably determined in the steps S26 or S28 is then taken into account. Through this approach, the correct actual switching position SK of the switching device 9 can be determined with high reliability through the parallel determination of the estimated old position intake pipe pressure MAP_EST_A and the estimated new position intake pipe pressure MAP_EST_N.

Preferably steps S30 to S34 are additionally executed in parallel with the steps S10 to S14. The step S30 differs from step S12 in that a background trimming value TRIM_B in the step S30 is determined through adaptive adjustment of the background trimming value TRIM_B dependent on adapted estimated new position intake pipe pressure MAP_EST_AD_N determined with corresponding passes of the step S4 and the associated measured intake pipe pressure MAP_MES. If with the preceding calculation cycle of the program according to the FIGS. 2 and 3 the condition of the step S3 was not fulfilled, the last valid trimming value TRIM is assigned to the background trimming value TRIM_B in the step S30.

The step S32 corresponds to the step S12. In the step S34 the adapted estimated new position intake pipe pressure MAP_EST_AD_N is then determined dependent on the dynamic physical model of the intake pipe pressure corresponding to the approach according to that of step S14, wherein the background trimming value TRIM_B is taken into account and for determining the estimated intake pipe pressure MAP_EST determined with the preceding calculation cycles the new position intake pipe pressure MAP_EST_AD_N determined during the corresponding preceding calculation cycle is utilized. If the steps S30 to S34 are provided, the trimming value TRIM can be assigned the background trimming value TRIM_B for the following processing of the step S4 in connection with the execution of the step S28. This has the advantage that with prolonged processing of the steps S10 to S28 caused through a plurality of passes accompanying changes with regard to influence quantities which form interference quantities of the model such can be taken into account directly during the next processing of the step S4 and thus in the step S8 the estimated intake pipe pressure MAP_EST can be determined with greater precision.

A further program for operating the internal combustion engine is explained in more detail in the following by means of FIG. 4. The program comprises the steps S1 to S18 and preferably S30 to S34 according to the FIGS. 2 and 3. A step S40 is executed following the steps S14, S18 and if applicable S34. In the step S40 an estimated old position air mass flow MAF-EST-A is determined dependent on the estimated old position intake pipe pressure MAP_EST_A, the pressure PUT upstream of the throttle flap 5 and the reduced flow cross section ARED. This can for example be effected according to the approach disclosed in U.S. Pat. No. 5,889,205 (EP 0820 559 B1), which is incorporated by reference in this regard, and more preferably in accordance with the relationship 2.3 there. Furthermore, in the step S40, an estimated new position air mass flow MAF_EST_N is also determined dependent on the estimated new position intake pipe pressure MAP-EST-N, the pressure PUT upstream of the throttle flap 5 and the reduced flow cross section ARED. With preceding execution of the steps S30 to S34 an adapted estimated new position air mass flow MAF_N_AD_EST is determined in the step S40 dependent on the adapted estimated new position intake pipe pressure MAP_EST_AD_N, the pressure PUT upstream of the throttle flap 5 and the reduced flow cross section ARED.

Furthermore in the step S40, an air mass estimate value difference DMAF is determined, specifically dependent on an amount ABS of the estimated old position air mass flow MAF_EST_A less the estimated new position air mass flow MAF_EST_N.

In a step S42 it is checked if the air mass estimated value difference DMAF is greater than the suitably predetermined threshold value TH D. The threshold value TH D is so predetermined here that reliable identification of the actual switching position SK of the switching device 9 becomes possible by means of the following steps only after exceeding of the estimated value difference DMAF with respect to the threshold value THD.

If the condition of the step S42 is thus not fulfilled, processing is continued again in the step S2 if applicable after the predetermined waiting period or the predetermined crankshaft angle. If the condition of the step S42 is however fulfilled, it is checked in a step S44 if the amount ABS of a difference of the estimated old position air mass flow MAF_EST_A and the measured air mass flow MAF_MES is smaller than the amount ABS of a difference of the estimated new position air mass flow MAF_EST_N and the measured air mass flow MAF_MES. Through this condition a concrete realization of a correlation check of the estimated old position air mass flow MAF_EST_A and the estimated new position air mass flow MAF_EST_N thus takes place with respect to the measured air mass flow MAF_MES.

If the condition of the step S44 is fulfilled, the old position SK_A is identified in a step S46 as the actual switching position SK of the switching device 9 and thus no modification of the switching position SK has actually taken place despite the controlled modification of the switching position SK of the switching device 9.

If the condition of the step S44 however has not been fulfilled, the switching position SK is then assigned to the new position SK_N in a step S48 and thus identified as the actual switching position SK. Alternatively the condition of the step S44 can be expanded to the effect that the original condition of the step S44 has to be fulfilled with multiple passes of the step S44 before the steps S46 or S48 then have to be suitably executed. In this case a feedback of the step S44 to the step S2 is then additionally provided.

In connection with the execution of the steps S46 and S48 the marker M is also preferably reset again. With a pass of the step S6 following this, the switching position SK suitably determined in the steps S46 or S48 is then taken into account.

Figure 4:
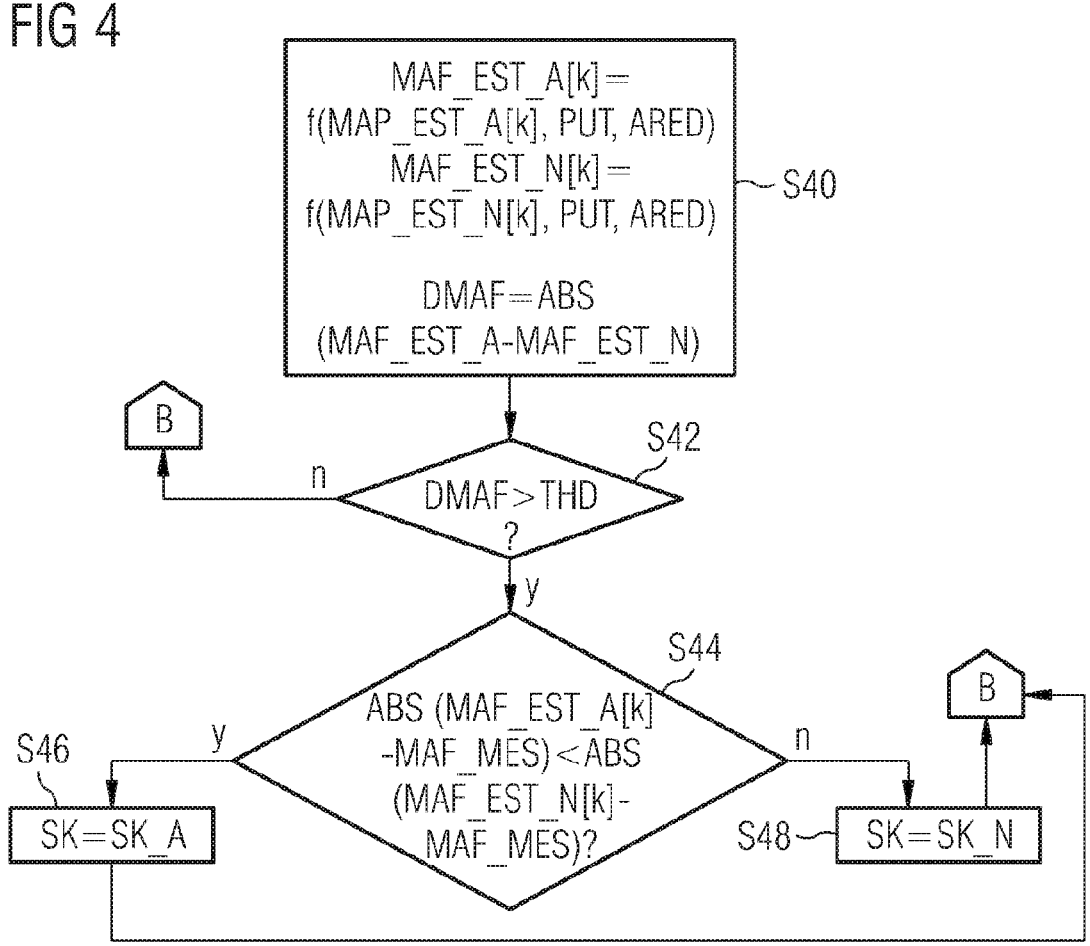

With the embodiment of the program according to FIG. 4 the trimming value TRIM in the step S4 (FIG. 3) is preferably adaptively adjusted dependent on the estimated air mass flow MAF_EST determined in connection with a preceding pass of the step S40 and the associated measured air mass flow MAF_MES. In this connection the trimming value TRIM is adaptively adjusted in the step S4 so that a deviation between the estimated air mass flow MAF_EST and the measured air mass flow MAF_MES is minimized. In this connection values of the trimming value TRIM which were determined with preceding passes are thus also taken into account.

With the embodiment of the program according to the FIG. 4 the background trimming value TRIM_B is determined in the step S30 through adaptive adjustment of the background trimming value TRIM_B depending on adapted estimated new position air mass flow MAF_EST_AD_N and the associated measured air mass flow MAF_MES determined with corresponding passes of the step S34. If with the preceding calculation cycle of the program according to the FIGS. 2 and 3 the condition of the step S3 was not fulfilled, the last valid trimming value TRIM is assigned to the background trimming value TRIM_B in the step S30.

What is claimed is:

1. A method for operating an internal combustion engine with an intake tract, in which a switching device for modifying at least one of an effective intake pipe length and an effective intake tract volume is arranged, the method comprising the steps of:
   with the switching device positioned in a first switching position, controlling an operational aspect of the internal combustion engine based on a dynamic model of the intake tract, which accounts for adaptive adjustments of a trimming value, by:
      using a dynamic model of the intake tract, determining an estimated value of a load parameter dependent on at least one operating quantity of the internal combustion engine, the load parameter selected from the group consisting of an intake pipe pressure and an air mass flow,
      adapting the dynamic model dependent on the trimming value, which is adaptively adjusted dependent on the estimated value of the load parameter and a measured value of the load parameter,
   in response to detecting a control instruction to modify the switching position of the switching device, determining an actual switching position of the switching device by a position determination process during which the trimming value is held constant, the position determination process including:
      determining an estimated old position value of the load parameter dependent on the model, wherein the first switching position of the switching device is assumed and adaptive adjustment of the trimming value is prevented,
      determining an estimated new position value of the load parameter dependent on the model, wherein a second switching position of the switching device is assumed and adaptive adjustment of the trimming value is prevented, and
      performing a correlation check of the estimated value of the load parameter and the estimated new position value of the load parameter with respect to the measured value of the load parameter to determine the actual switching position of the switching device; and
   after determining the actual switching position of the switching device by the process during which the trimming value is held constant, controlling the operational aspect of the internal combustion engine based on the dynamic model of the intake tract and the determined actual switching position of the switching device, and again accounting for adaptive adjustments of the trimming value.

2. The method according to claim 1, wherein the estimated old position and new position values of the load parameter are determined so long after the controlling of the modification of the switching position of the switching device until one of the estimated old position or the new position values of the load parameter in predetermined manner correlates more strongly to the measured value of the load parameter.

3. The method according to claim 1, wherein in the event that a modification of the switching position of the switching device is controlled, an adapted estimated new position value of the load parameter is additionally determined dependent on the model assuming the occupation of the second switching position of the switching device and continuation of the adaptive adjustment of the trimming value and upon identified concurrence of the actual switching position with the control switching position the further adaptively adjusted trimming value is used as a base for the model.

4. A device for operating an internal combustion engine with an intake tract in which a switching device for modifying at least one of an effective intake pipe length and an effective intake tract volume is arranged, wherein the device is operable, while the switching device is positioned in a first switching position, to control an operational aspect of the internal combustion engine based on a dynamic model of the intake tract, which accounts for adaptive adjustments of a trimming value, by:

determining an estimated value of a load parameter dependent on at least one operating quantity of the internal combustion engine by means of a dynamic physical model, the load parameter selected from the group consisting of an intake pipe pressure and an air mass flow, adapting the dynamic model dependent on a trimming value which is adaptively adjusted dependent on the estimated and a measured value of the load parameter, wherein the device is further operable in the event of detecting a control instruction to modify switching position of the switching device, to determine an actual switching position of the switching device by a position determination process during which the trimming value is held constant, the position determination process including:

determining an estimated old position value of the load parameter dependent on the model, wherein the first switching position of the switching device and adaptive adjustment of the trimming value is prevented, and determining an estimated new position value of the load parameter dependent on the model, wherein a second switching position of the switching device is assumed and adaptive adjustment of the trimming value is prevented, and determining the actual switching position of the switching device dependent on a correlation check of the estimated old position value of the load parameter and the estimated new position value of the load parameter with respect to the measured value of the load parameter; and wherein the device is further operable, after determining the actual switching position of the switching device by the process during which the trimming value is held constant, to control the operational aspect of the internal combustion engine based on the dynamic model of the intake tract and the determined actual switching position of the switching device, and again accounting for adaptive adjustments of the trimming value.

* * * * *

UNITED STATES PATENT AND TRADEMARK OFFICE
CERTIFICATE OF CORRECTION

PATENT NO. : 8,489,307 B2
APPLICATION NO. : 12/302556
DATED : July 16, 2013
INVENTOR(S) : Thomas Burkhardt et al.

It is certified that error appears in the above-identified patent and that said Letters Patent is hereby corrected as shown below:

Title Page
Item (30), Foreign Application Priority Data, field is missing, should read
"Jul. 28, 2006   (DE) ........................ 10 2006 035 096.0"

Signed and Sealed this
First Day of October, 2013

Teresa Stanek Rea
*Deputy Director of the United States Patent and Trademark Office*